UNITED STATES PATENT OFFICE.

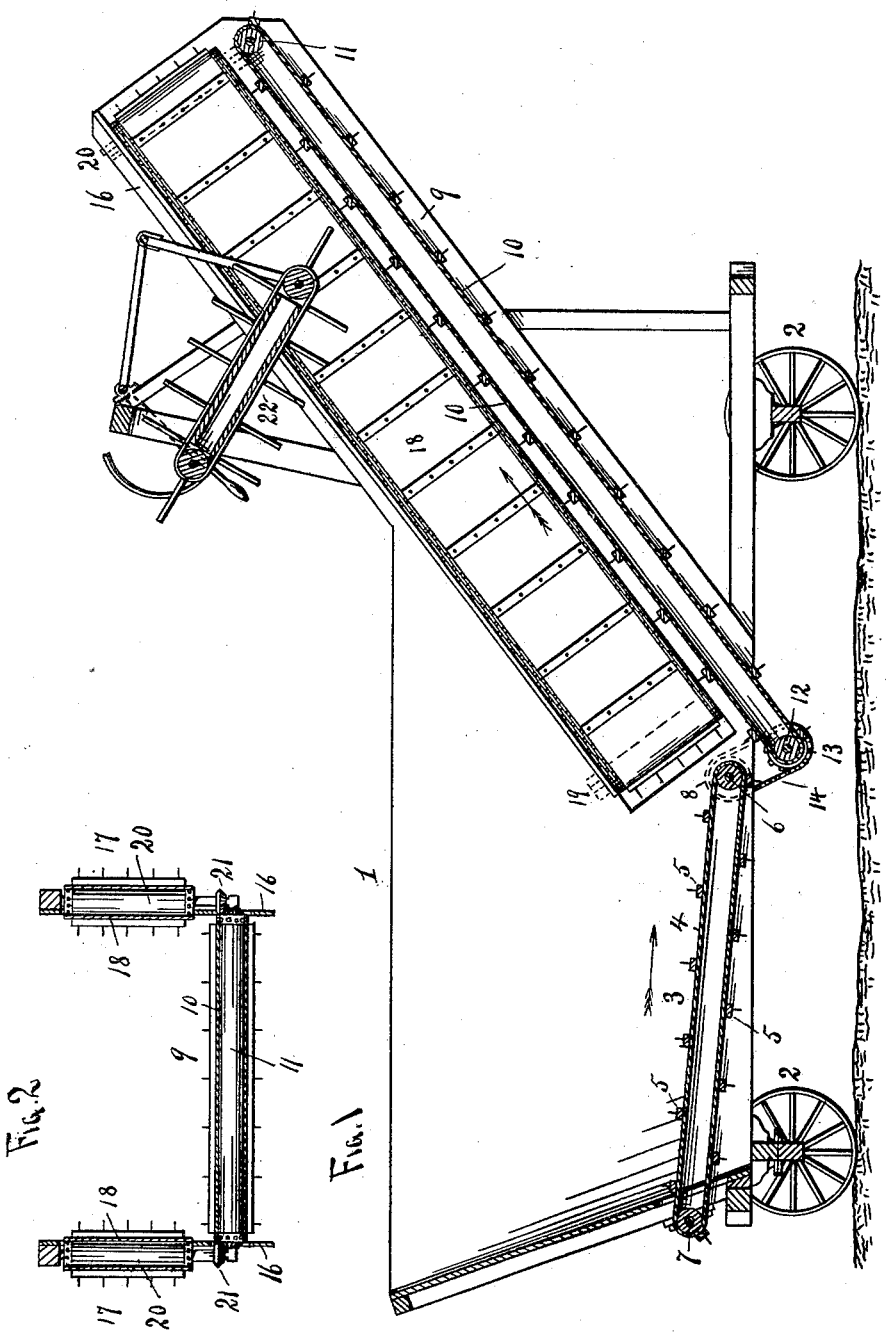

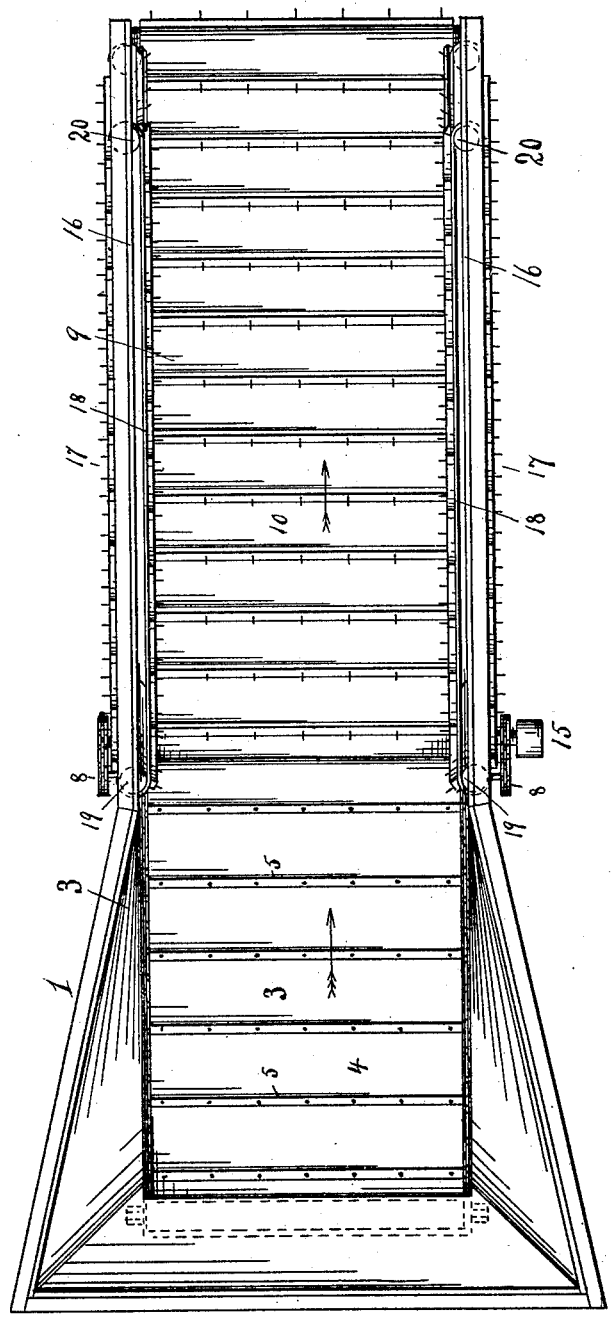

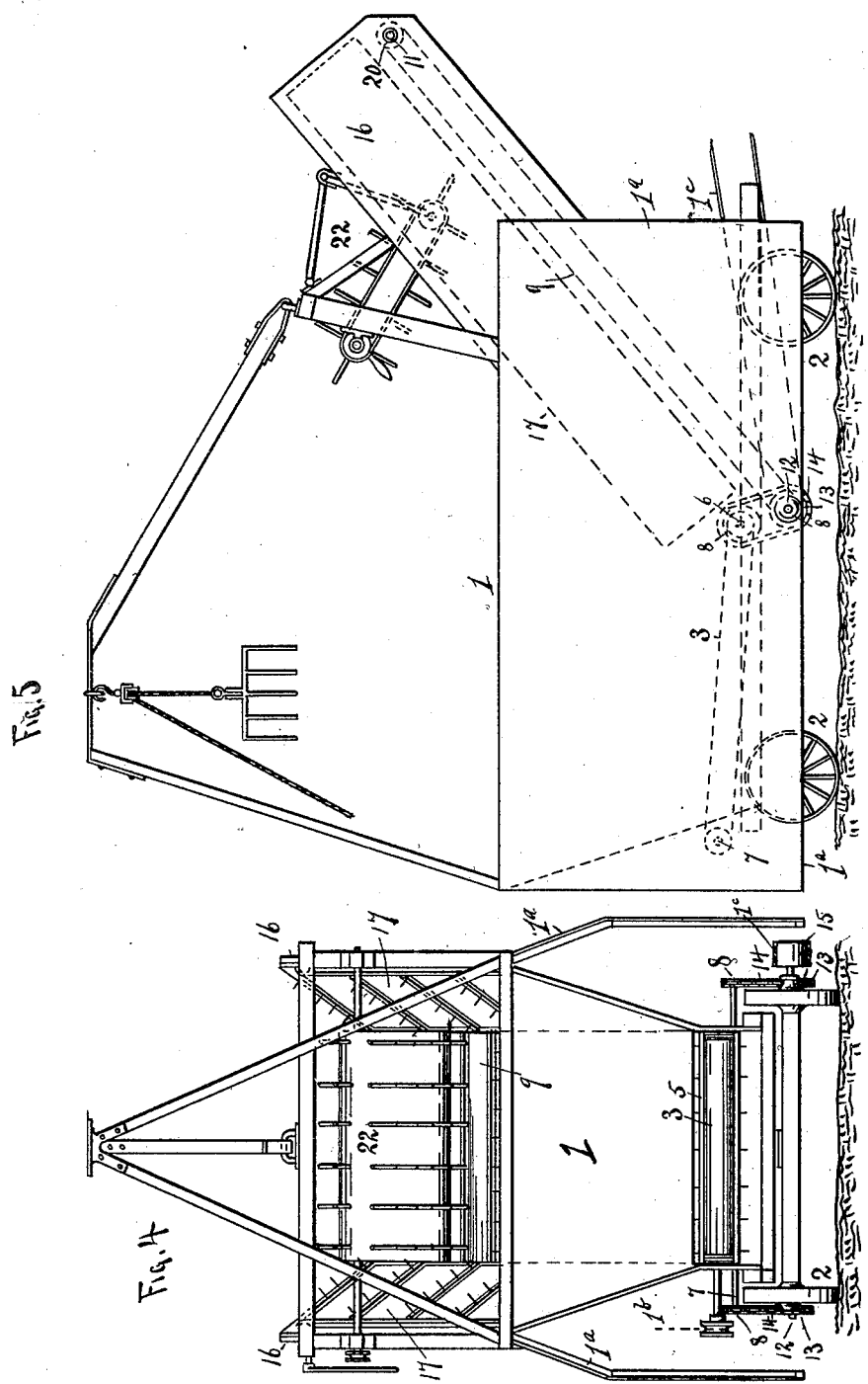

THOMAS E. MAHONEY, OF BUNKERHILL, KANSAS.

FEEDER FOR THRESHING-MACHINES.

SPECIFICATION forming part of Letters Patent No. 697,095, dated April 8, 1902.

Application filed April 27, 1901. Serial No. 57,805. (No model.)

*To all whom it may concern:*

Be it known that I, THOMAS E. MAHONEY, a citizen of the United States, residing at Bunkerhill, in the county of Russell and State of Kansas, have invented a new and useful Feeder for Threshing-Machines, of which the following is a specification.

My invention is an improved feeder for threshing-machines; and it consists in the peculiar construction and combination of devices hereinafter fully set forth and claimed.

My present invention is an improvement upon the threshing-machine feeder for which Letters Patent of the United States No. 658,665 were granted to me September 25, 1900.

The object of my present improvements is to provide an additional conveyer in the bottom of the hopper to feed the grain to the feeder-conveyer, and a further object of my present improvements is to provide side conveyers which operate on opposite sides of and in conjunction with the feed-conveyer, thereby increasing the efficiency of the machine.

In the accompanying drawings, Figure 1 is a vertical longitudinal sectional view of a threshing-machine feeder embodying my improvements. Fig. 2 is a transverse sectional view of the same, taken on a plane indicated by the line $a\ a$ of Fig. 1. Fig. 3 is a top plan view of the same with the governor omitted. Fig. 4 is an end elevation of a modified form of my invention. Fig. 5 is a side elevation of the same.

In carrying out my present improvements I lengthen the hopper 1, which is mounted on the trucks 2, and in the bottom thereof from its front end to a point near its center I locate an endless traveling conveyer 3, which comprises the endless traveling element 4, having the usual cross-bars 5, and the roller-shafts 6 7, which are connected by the endless traveling element. The said shafts are mounted in suitable bearings, and the shaft 6 has at its ends sprocket-wheels 8. The inclined feeder-conveyer 9, which conveys the grain from the hopper to the separating and threshing machine, is disposed in the rear portion of the hopper and extends beyond and above the rear side thereof, as shown. The said feeder-conveyer comprises the endless traveling element 10 and the roller-shafts 11 12, which are connected together thereby. The said shafts are journaled in suitable bearings. The shaft 12 is provided with sprocket-wheels 13, which are connected to the sprocket-wheels 8 of shaft 6 by endless sprocket-chains 14, and said shaft 12 is further provided with a suitable power-pulley 15, by which it may be driven to convey power to the feeder-conveyer 9 and to the conveyer 3. The former is fed by the latter.

The grain may be delivered to the hopper of my improved feeder either by means of a derrick-fork such as is described in the Letters Patent granted to me, hereinbefore mentioned, or by any other suitable means, and I do not limit myself in this particular.

The sides of the hopper are provided with the inclined extensions 16, which are on opposite sides of that portion of the feeder-conveyer 9 which extends beyond and above the rear end of the hopper.

In the sides of the hopper and at any suitable angle to the feeder-conveyer 9 and on the sides thereof are auxiliary conveyers 17, each of which comprises an endless traveling element 18 of suitable construction and a pair of roller-shafts 19 20, the former being located at the lower inner ends of said auxiliary conveyers and the latter being located at the outer ends thereof, as shown. The said shafts 20 are connected to the shaft 11 of the feeder-conveyer by miter-gears 21, and thereby power is conveyed from the feeder-conveyer to the auxiliary conveyers and the latter are caused to operate in unison with the former, as indicated by the arrows in the drawings.

A governor mechanism 22, which is here shown as of the construction described in the before-mentioned Letters Patent, but which may be of any suitable construction, is located above the feeder-conveyer 9, near the discharge end thereof and between the auxiliary or side conveyers 17, and in combination with said feeder and auxiliary conveyers regulates the quantity of grain delivered by the feeder and auxiliary conveyers to the threshing and separating machine.

On the outer sides of the hopper are overhanging shields $1^a$, which extend nearly the entire length of the machine, which shields cover the driving-belts, as shown, the driving-belts being indicated at $1^b\ 1^c$, and thus preventing the same from being obstructed by loose grain and also preventing the operatives from being caught by the belts.

Having thus described my invention, I claim—

In a feeder for threshing-machines, the combination with a hopper, of a feeder-conveyer leading therefrom, a conveyer in the bottom of the said hopper discharging onto said feeder-conveyer, auxiliary conveyers on the sides of said feeder-conveyer, and at an angle thereto, and a governor mechanism disposed above said feeder-conveyer and between said auxiliary conveyers, substantially as described.

In testimony that I claim the foregoing as my own I have hereto affixed my signature in the presence of two witnesses.

THOMAS E. MAHONEY.

Witnesses:
W. H. BIAYS,
G. W. CARNELS.